(12) United States Patent
   Shibukawa

(10) Patent No.: US 10,191,425 B2
(45) Date of Patent: Jan. 29, 2019

(54) DEVICE AND CONTROL METHOD

(71) Applicant: Tomoki Shibukawa, Kanagawa (JP)

(72) Inventor: Tomoki Shibukawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 14/565,550

(22) Filed: Dec. 10, 2014

(65) Prior Publication Data

US 2015/0169028 A1    Jun. 18, 2015

(30) Foreign Application Priority Data

Dec. 16, 2013 (JP) .................. 2013-258940

(51) Int. Cl.
   *G06F 1/32* (2006.01)
   *G03G 15/00* (2006.01)

(52) U.S. Cl.
   CPC ......... *G03G 15/5004* (2013.01); *G03G 15/80* (2013.01); *G06F 1/3209* (2013.01); *G06F 1/3287* (2013.01); *Y02D 10/171* (2018.01)

(58) Field of Classification Search
   None
   See application file for complete search history.

(56) References Cited

U.S. PATENT DOCUMENTS

| | | | | |
|---|---|---|---|---|
| 5,978,923 A * | 11/1999 | Kou | .................... | G06F 1/3203 713/323 |
| 6,697,953 B1 * | 2/2004 | Collins | ................. | G06F 1/3203 713/320 |
| 8,542,372 B2 | 9/2013 | Nishio | | |
| 8,713,341 B2 | 4/2014 | Utoh | | |
| 2004/0139385 A1 * | 7/2004 | Sakaue | ................. | G06F 1/3203 715/210 |
| 2005/0060588 A1 * | 3/2005 | Araki | .................... | G06F 1/3203 713/300 |
| 2006/0184809 A1 | 8/2006 | Kojou et al. | | |
| 2011/0138206 A1 * | 6/2011 | Garcia-Tobin | ........ | G06F 1/3203 713/322 |
| 2012/0284543 A1 * | 11/2012 | Xian | .................... | G06F 1/3206 713/320 |
| 2014/0082389 A1 * | 3/2014 | Sadowski | ............. | G06F 1/3206 713/323 |

FOREIGN PATENT DOCUMENTS

| | | |
|---|---|---|
| JP | 2006-221453 | 8/2006 |
| JP | 2007-60150 | 3/2007 |
| JP | 2011-087160 | 4/2011 |
| JP | 2011-159184 | 8/2011 |
| JP | 2012-029277 | 2/2012 |

OTHER PUBLICATIONS

Japanese Office Action for 2013-258940 dated Aug. 29, 2017.

* cited by examiner

*Primary Examiner* — Paul B Yanchus, III
(74) *Attorney, Agent, or Firm* — IPUSA, PLLC

(57) ABSTRACT

A device includes a reception unit configured to receive, from outside the device, a usage request to use one of a plurality of hardware resources of the device; and a selection unit configured to select a combination of the plurality of hardware resources to which power is to be supplied, according to a state of the device. The selection unit restricts a selection of a combination, in which power is not supplied to the one of the plurality of hardware resources relevant to the usage request received from the reception unit, among the combinations of the plurality of hardware resources.

16 Claims, 7 Drawing Sheets

FIG.6

| RESOURCE | USAGE STATUS |
|---|---|
| SCANNER | OFF |
| PRINTER | OFF |
| HDD | ON |
| COMMUNICATION INTERFACE | OFF |

FIG.7

| ENERGY SAVING LEVEL | POWER SUPPLY TARGET | | | |
|---|---|---|---|---|
| | SCANNER | PRINTER | HDD | COMMUNICATION INTERFACE |
| 1 | ○ | ○ | ○ | ○ |
| 2 | ○ | × | ○ | ○ |
| 3 | × | × | ○ | ○ |
| 4 | × | × | ○ | × |
| 5 | × | × | × | ○ |

DEVICE AND CONTROL METHOD

BACKGROUND OF THE INVENTION

1. Field of the Invention

The present invention relates to a device and a control method.

2. Description of the Related Art

For the purpose of reducing the load on the environment and reducing the operation cost, a device such as an image forming apparatus has a power saving state in which power is not supplied to some of the hardware resources according to the operation status. Furthermore, in order to alleviate the reduction in the responsiveness to a request to execute a job due to the shift to a power saving state, there is devised a technique of providing a plurality of stages in the power saving state.

However, conventionally, the shift to a power saving state or changing the stage of the power saving state has been determined based on the state inside the device. Therefore, for example, when there is an external device using the hardware resources of the device, the circumstances of the external device have not been considered when shifting to a power saving state or changing the stage of the power saving state.

Patent Document 1: Japanese Laid-Open Patent Publication No. 2012-029277

SUMMARY OF THE INVENTION

The present invention provides a device, an information processing system, and a control method, in which one or more of the above-described disadvantages are eliminated.

According to an aspect of the present invention, there is provided a device including a reception unit configured to receive, from outside the device, a usage request to use one of a plurality of hardware resources of the device; and a selection unit configured to select a combination of the plurality of hardware resources to which power is to be supplied, according to a state of the device, wherein the selection unit restricts a selection of a combination, in which power is not supplied to the one of the plurality of hardware resources relevant to the usage request received from the reception unit, among the combinations of the plurality of hardware resources.

According to an aspect of the present invention, there is provided a control method performed by a device, the control method including receiving, from outside the device, a usage request to use one of a plurality of hardware resources of the device; and selecting a combination of the plurality of hardware resources to which power is to be supplied, according to a state of the device, wherein the selecting includes restricting a selection of a combination, in which power is not supplied to the one of the plurality of hardware resources relevant to the usage request received at the receiving, among the combinations of the plurality of hardware resources.

According to an aspect of the present invention, there is provided a non-transitory computer-readable recording medium storing a program that causes a computer to execute a process, the process including receiving, from outside the device, a usage request to use one of a plurality of hardware resources of the device; and selecting a combination of the plurality of hardware resources to which power is to be supplied, according to a state of the device, wherein the selecting includes restricting a selection of a combination, in which power is not supplied to the one of the plurality of hardware resources relevant to the usage request received at the receiving, among the combinations of the plurality of hardware resources.

BRIEF DESCRIPTION OF THE DRAWINGS

Other objects, features and advantages of the present invention will become more apparent from the following detailed description when read in conjunction with the accompanying drawings, in which:

FIG. 6 illustrates a configuration example of a resource management table;

FIG. 7 illustrates a configuration example of an energy saving level table;

DETAILED DESCRIPTION OF THE PREFERRED EMBODIMENTS

Figure 1:
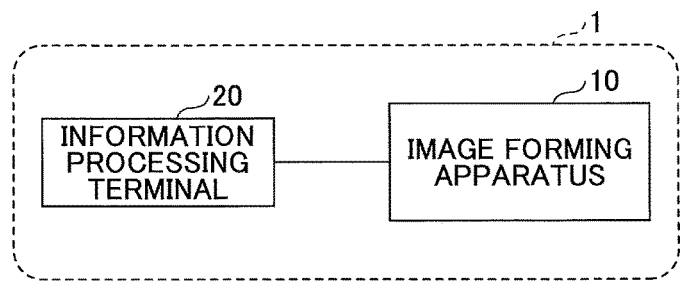
FIG. 1 illustrates a configuration example of an information processing system according to an embodiment of the present invention.

A description is given, with reference to the accompanying drawings, of embodiments of the present invention. FIG. 1 illustrates a configuration example of an information processing system according to an embodiment of the present invention. In an information processing system 1 illustrated in FIG. 1, an image forming apparatus 10 and an information processing terminal 20 are connected such that communication is possible. The communication between the image forming apparatus 10 and the information processing terminal 20 is performed via a network such as USB (Universal Serial Bus), Near Field Communication, or LAN (wired or wireless).

The image forming apparatus 10 is a multifunction peripheral that realizes two or more functions among printing, scanning, copying, and fax transmission/reception, in a single casing. However, a device including one of these functions may be used as the image forming apparatus 10. Furthermore, the image forming apparatus 10 according to the present embodiment is one example of the device; a device such as a projector, a TV conference system, or a digital camera may be used instead of the image forming apparatus 10.

The information processing terminal 20 is an electronic device such as a smartphone or a tablet terminal, which can execute a complete information process by itself. In the present embodiment, the information processing terminal 20 functions as an operation unit of the image forming apparatus 10. More specifically, the information processing terminal 20 is connected to the image forming apparatus 10, instead of an operation panel set as an exclusive operation unit of the image forming apparatus 10 in conventional cases.

For example, the information processing terminal 20 is fixed at a predetermined position of the image forming apparatus 10 (for example, at a position where the operation panel is arranged). Therefore, the information processing terminal 20 and the image forming apparatus 10 may be recognized as a single device. Alternatively, the information processing terminal 20 may be removable (separable) from the image forming apparatus 10. In the removed state, the information processing terminal 20 may function as an operation unit of the image forming apparatus 10 via wireless communication such as Bluetooth (registered trademark) or infrared rays.

Figure 2:
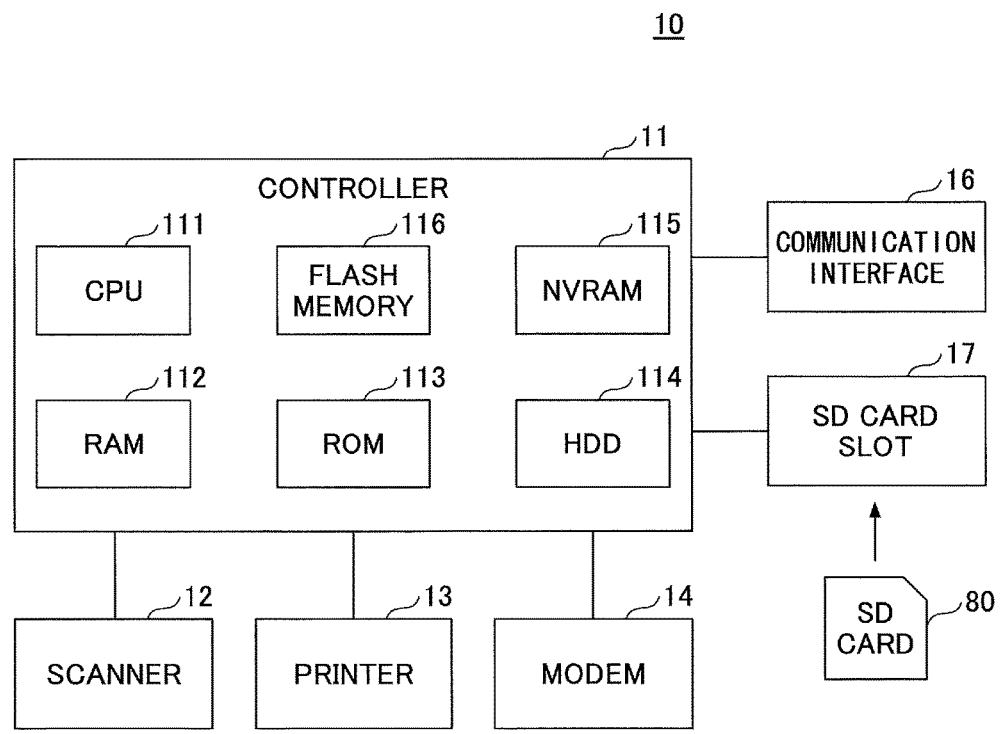
FIG. 2 illustrates a hardware configuration example of an image forming apparatus according to an embodiment of the present invention.

FIG. 2 illustrates a hardware configuration example of the image forming apparatus 10 according to an embodiment of the present invention. In FIG. 2, the image forming apparatus 10 includes hardware elements such as a controller 11, a scanner 12, a printer 13, a modem 14, a communication interface 16, and an SD card slot 17.

The controller 11 includes a CPU 111, a RAM 112, a ROM 113, a HDD 114, a NVRAM 115, and a flash memory 116. The ROM 113 stores various programs and data used by programs. The RAM 112 is used as a storage area for loading programs, and a work area of a loaded program. The CPU 111 realizes various functions by processing programs loaded in the RAM 112. The HDD 114 and the flash memory 116 stores programs and various data objects used by the programs. As the flash memory 116, a NAND (Not AND) type flash memory may be used. The NVRAM 115 stores, for example, the value of a counter that is updated according to the execution of a job.

The scanner 12 is hardware (image scanning unit) for scanning an original document to obtain image data. The printer 13 is hardware (printing unit) for printing print data onto a print sheet. The modem 14 is hardware for connecting to a telephone line, and is used for executing the transmission/reception of image data by fax communication. The communication interface 16 is an assembly of interfaces for communication. For example, the communication interface 16 includes an interface for USB (Universal Serial Bus) connection, and an interface for connecting to a network (wired or wireless) such as a LAN (Local Area Network).

The SD card slot 17 is used for reading programs stored in an SD card 80. That is to say, in the image forming apparatus 10, not only the programs stored in the ROM 113, but also the programs stored in the SD card 80 are loaded in the RAM 112, and the loaded programs are executed. Note that the SD card 80 may be replaced by other types of recording media (for example, a CD-ROM or a USB (Universal Serial Bus) memory). That is to say, the type of recording medium corresponding to the SD card 80 is not limited to a particular type. In this case, the SD card slot 17 is to be replaced by a hardware element according to the type of recording medium.

Figure 3:
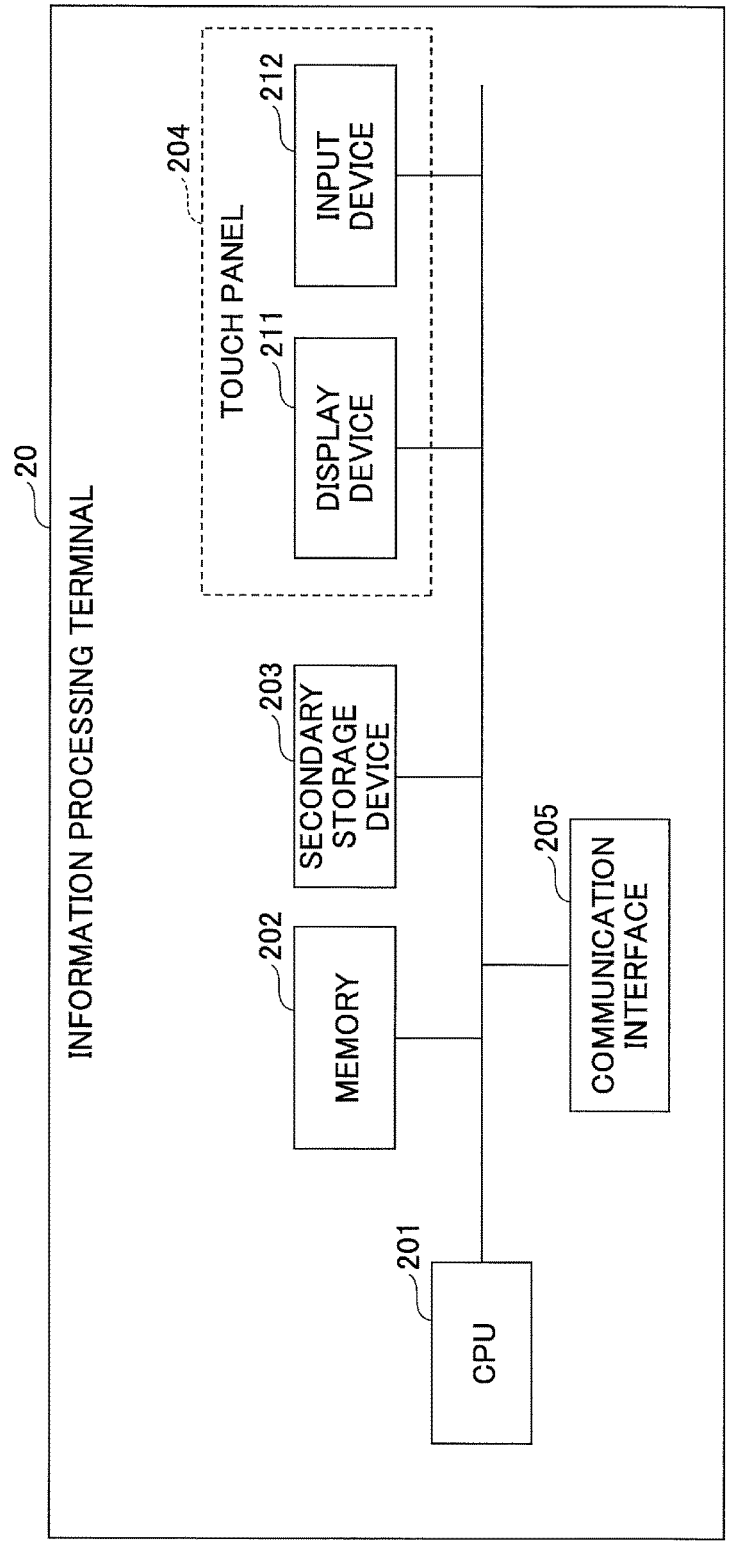
FIG. 3 illustrates a hardware configuration example of an information processing terminal according to an embodiment of the present invention.

FIG. 3 illustrates a hardware configuration example of the information processing terminal 20 according to an embodiment of the present invention. In FIG. 3, the information processing terminal 20 includes a CPU 201, a memory 202, a secondary storage device 203, a touch panel 204, a communication interface 205, and a device interface 206.

The secondary storage device 203 stores programs installed in the information processing terminal 20. The memory 202 reads programs from the secondary storage device 203 and stores the programs, when an instruction to activate a program is given. The CPU 201 realizes functions relevant to the information processing terminal 20 according to programs stored in the memory 202.

The touch panel 204 is an electronic component including both an input function and a display function, and displays information and receives input from a user. The touch panel 204 includes a display device 211 and an input device 212.

The display device 211 is a liquid crystal display, and has a display function of the touch panel 204. The input device 212 is an electronic component including a sensor for detecting the contact of a contact object with respect to the display device 211. The method of detecting the contact of a contact object may be any known method such as an electrostatic method, a resistance film method, or an optical method. Note that a contact object is an object that contacts the contact surface (front side) of the touch panel 204. An example of such an object is the user's finger or an exclusive-use pen or a typical pen.

The communication interface 205 is an assembly of interfaces for communication. For example, the communication interface 205 includes an interface for USB (Universal Serial Bus) connection, and an interface for connecting to a network (wired or wireless) such as a LAN (Local Area Network).

Figure 4:
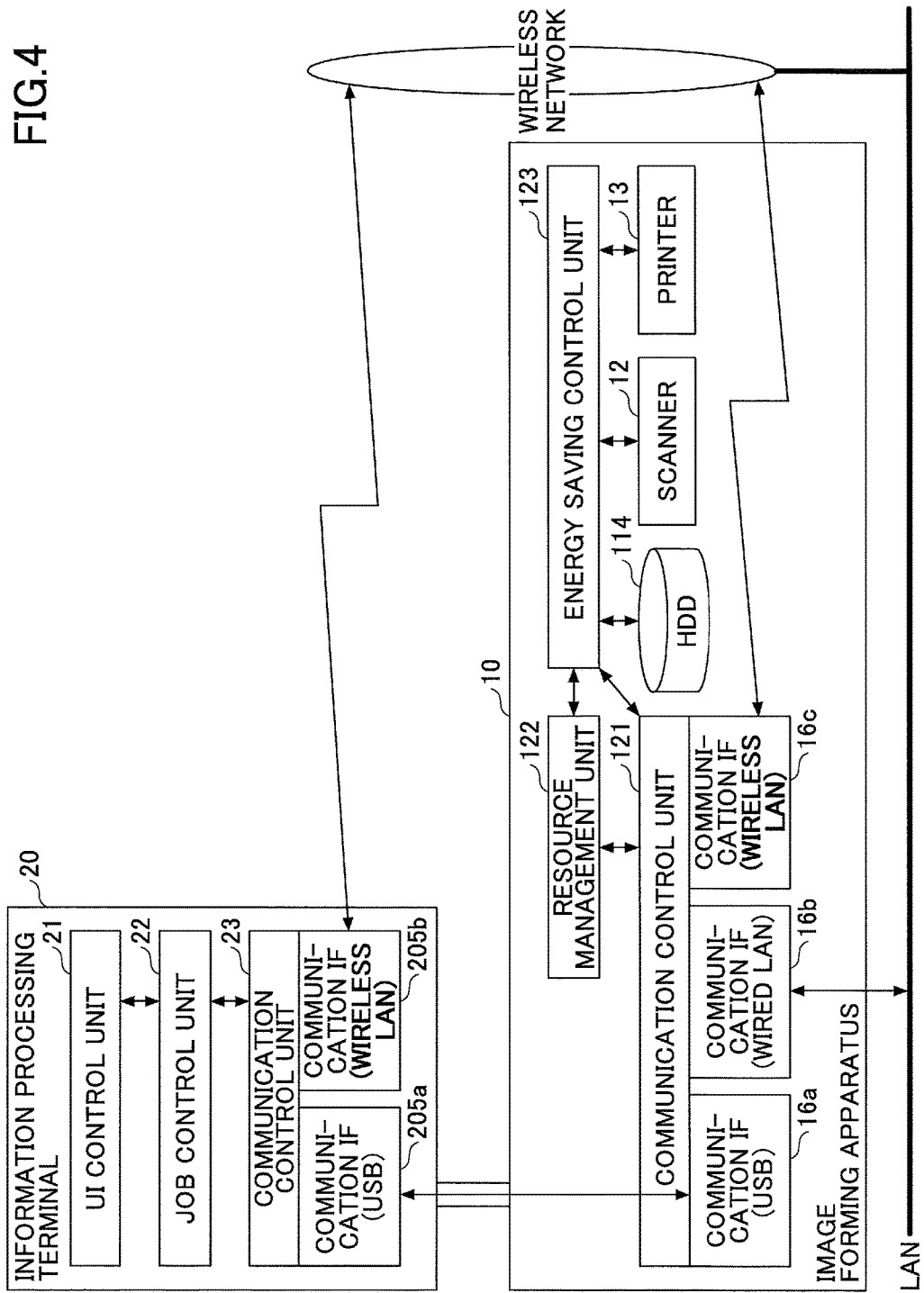
FIG. 4 illustrates a functional configuration example of the information processing system according to an embodiment of the present invention.

FIG. 4 illustrates a functional configuration example of the information processing system 1 according to an embodiment of the present invention. In FIG. 4, the information processing terminal 20 includes a UI control unit 21, a job control unit 22, and a communication control unit 23. These units are realized by processes that the CPU 201 is caused to execute by programs installed in the information processing terminal 20.

The UI control unit 21 implements control of displaying a screen on the display device 211, and processes according to input via the input device 212. The job control unit 22 implements control of execution of a job, according to an instruction to execute a job input via the input device 212. The job control unit 22 uses the hardware resources (hereinafter, simply referred to as "resources") of the image forming apparatus 10 in the process of executing jobs. Note that the job control unit 22 may be realized by processes that the CPU 201 is caused to execute by application programs installed in the information processing terminal 20. In this case, the contents of the job to be executed by the job control unit 22 may differ according to the application program used by the user. In the present embodiment, it is assumed that the job control unit 22 executes a job to cause the display device 211 to serve the function of providing for a digital signage (hereinafter, "signage job"). The image data used for digital signage is stored in the HDD 114 of the image forming apparatus 10. That is to say, in the present embodiment, the resource of the image forming apparatus 10 used by the job control unit 22 is the HDD 114. However, the resource used by the job control unit 22 is not limited to the HDD 114. For example, when the job control unit 22 is a web browser, the job control unit 22 may use the communication interface 16 of the image forming apparatus 10 and download a web page.

The communication control unit 23 controls communication with the image forming apparatus 10, by using the communication interface 205. In the example of FIG. 4, the information processing terminal 20 is connected to the image forming apparatus 10 via a communication interface 205a for USB connection or a communication interface 205b for wireless LAN communication. A communication interface 205 corresponding to other standards such as Bluetooth (registered trademark) or IrDA (Infrared Data Association) may be used.

The image forming apparatus 10 includes a communication control unit 121, a resource management unit 122, and an energy saving control unit 123. These units are realized by processes that the CPU 111 is caused to execute by programs installed in the image forming apparatus 10.

The communication control unit 121 uses the communication interface 16 to control communication with the information processing terminal 20 and communication with other devices. FIG. 4 illustrates an example of using a communication interface 16a for USB connection, a communication interface 16b for performing wired LAN communication, and a communication interface 16c for performing wireless LAN communication. Among these, the communication interface 16a and the communication interface 16c are used for communication with the information processing terminal 20, and the communication interface 16b is used for performing communication with other devices via wired LAN. A communication interface 16 corresponding to other standards such as Bluetooth (registered trademark) or IrDA (Infrared Data Association) may be used.

The resource management unit 122 manages the usage status of the resources of the image forming apparatus 10. The energy saving control unit 123 implements control to reduce the power consumption of the image forming apparatus 10, by selecting (changing) the combination of resources to which power is supplied, according to the state of the image forming apparatus 10. Specifically, the energy saving control unit 123 selects a power saving state (hereinafter, "energy saving mode") appropriate for the operation state of the image forming apparatus 10, from among a plurality of energy saving modes corresponding to different combinations of resources to which power is supplied, according to the state of the image forming apparatus 10. The state of the image forming apparatus 10 is the state according to input to the image forming apparatus 10 by the user and the operation status of the image forming apparatus 10.

In the present embodiment, the energy saving mode includes five levels (hereinafter, "energy saving levels") of level 1 through level 5. The power consumption is at a maximum in level 1, and the power consumption is at a minimum in level 5. Note that in the present embodiment, the HDD 114, the scanner 12, the printer 13, and the communication interface 16 are the targets to be controlled by the energy saving control unit 123; however, other resources may be included as the targets of control.

Figure 5:
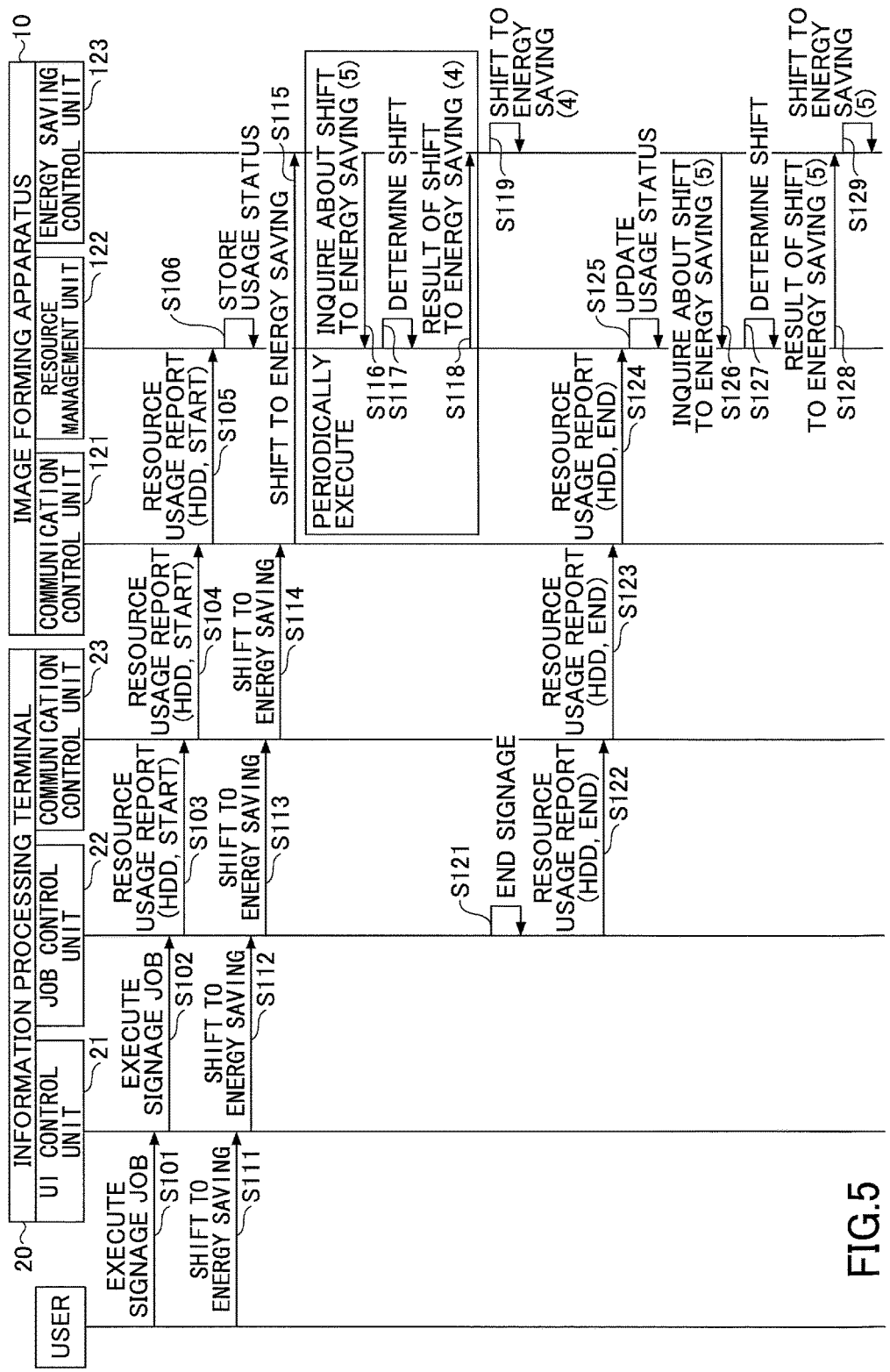
FIG. 5 is a sequence diagram of a first example of processing procedures executed by the information processing system.

In the following, a description is given of processing procedures executed by the information processing system 1. FIG. 5 is a sequence diagram of a first example of processing procedures executed by the information processing system 1. Note that at the time of start in FIG. 5, it is assumed that the image forming apparatus 10 has not shifted to the energy saving mode.

When the user inputs an instruction to execute a signage job via the input device 212 (step S101), the UI control unit 21 reports an instruction to execute a signage job to the job control unit 22 (step S102). The job control unit 22 sends report information relevant to the usage of resources necessary for executing the signage job, to the image forming apparatus 10 via the communication control unit 23 (steps S103, S104). The report information includes identification information of the HDD 114 that is a resource that is a usage target, and information indicating the start of usage.

The communication control unit 121 of the image forming apparatus 10 reports the report information to the resource management unit 122, when the report information is received (step S105). The resource management unit 122 stores information indicating the usage status of the resource in a resource management table based on the report information.

FIG. 6 illustrates a configuration example of a resource management table. In FIG. 6, the resource management table stores the usage status in association with identification information of the resource that is the control target of power supply, in the present embodiment. Note that it is assumed that the "communication interface" is the communication interface 16b. That is to say, the "communication interface" does not include the communication interfaces 16a and 16c used for communication with the information processing terminal 20.

The values of the usage status are "ON" or "OFF". "ON" indicates that the resource is being used. "OFF" indicates that the resource is not being used.

In step S105, as illustrated in FIG. 6, "ON" is stored for "HDD". Note that the resource management table may be realized by using, for example, the RAM 112.

Next, the job control unit 22 executes the signage job. The sequence of the signage job is not illustrated in FIG. 5; the job control unit 22 reads image data stored in the HDD 114, and the image data is displayed on the display device 211. A plurality of image data objects may sequentially read and displayed. A signage job may be executed over several minutes.

Here, it is assumed that, during the execution of the signage job by the job control unit 22, for example, the user inputs an instruction to shift to an energy saving mode via the input device 212 (step S111). The shift instruction is sent to the image forming apparatus 10 via the UI control unit 21, the job control unit 22, and the communication control unit 23 (steps S112 through S114).

When the shift instruction is received, the communication control unit 121 reports the shift instruction to the energy saving control unit 123 (step S115). The energy saving control unit 123 makes an inquiry to the resource management unit 122 as to whether it is possible to shift to level 5 by which maximum power saving effects can be achieved (step S116).

The resource management unit 122 determines the energy saving level to which shift is possible, based on the resource management table and the energy saving level table (step S117).

FIG. 7 illustrates a configuration example of an energy saving level table. The energy saving level table stores combinations of resources to which power is supplied, for the respective energy saving levels. That is to say, the energy saving level table stores whether each resource is a target to supply power, for each energy saving level. "○" indicates that the resource is a target to which power is to be supplied. "x" indicates that the resource is not a target to which power is to be supplied. Note that the energy saving level table may be stored in the flash memory 116 or the HDD 114, and loaded in the RAM 112 to be used.

In step S117, the resource management unit 122 selects the energy saving level by which the power consumption is minimum, as the energy saving level to which shift is possible, among the levels in which the resources whose usage statuses are "ON" are the power supply targets in the resource management table. Therefore, in this example, level 4 is selected. That is to say, among the energy saving levels to which shift is possible (energy saving levels that can be selected), the energy saving level by which the power consumption is minimum, is selected.

Note that according to the internal state of the image forming apparatus 10, the image forming apparatus 10 may be updated. That is to say, according to the external and internal circumstances of the image forming apparatus 10, the energy saving level to which shift is possible may be selected.

Next, the resource management unit 122 returns, to the energy saving control unit 123, a response indicating the energy saving level to which shift is possible (step S118). Next, the energy saving control unit 123 causes the image forming apparatus 10 to shift to the energy saving level indicated by the response (step S119). Specifically, the power supply to the resources that are not the power supply targets in the corresponding energy saving level, is stopped or reduced.

Note that steps S116 through S118 may be periodically executed. By periodically executing steps S116 through S118, the resource management unit 122 prevents the shift to level 5. However, when the energy saving level to which shift is possible changes while steps S116 through S118 are being periodically executed, step S119 is executed.

Furthermore, the trigger of shifting to the energy saving mode may not be the operation by the user. For example, according to the operation state of the image forming apparatus 10, the energy saving control unit 123 may automatically execute step S116.

As described above, while maintaining the power supply to the resources necessary for executing the signage job, the power supply to other resources is stopped or reduced. Therefore, while securing the responsiveness to the request from the job control unit 22, the effects of power saving can be achieved.

Subsequently, when the signage job is ended (step S121), the job control unit 22 sends report information indicating the end of usage of the HDD 114, to the image forming apparatus 10 via the communication control unit 23 (steps S122, S123).

The communication control unit 121 of the image forming apparatus 10 reports the report information to the resource management unit 122, when the report information is received (step S124). The resource management unit 122 updates the resource management table based on the report information (step S125). Specifically, "OFF" is stored for "HDD".

Therefore, subsequently, when the energy saving control unit 123 makes an inquiry to the resource management unit 122 as to whether it is possible to shift to level 5 (step S126), the resource management unit 122 determines that it is possible to shift to level 5 if "OFF" is stored for resources other than at least "communication interface" (step S127). That is to say, the resource management unit 122 allows the shift to level 5. Therefore, the resource management unit 122 returns a response indicating that level 5 has been selected, to the energy saving control unit 123 (step S128). The energy saving control unit 123 causes the image forming apparatus 10 to shift to level 5, in response to the response (step S129).

Subsequently, a description is given of a case where the image forming apparatus 10 has shifted to level 5 in which power is not supplied to the HDD 114, when starting the signage job.

Figure 8:
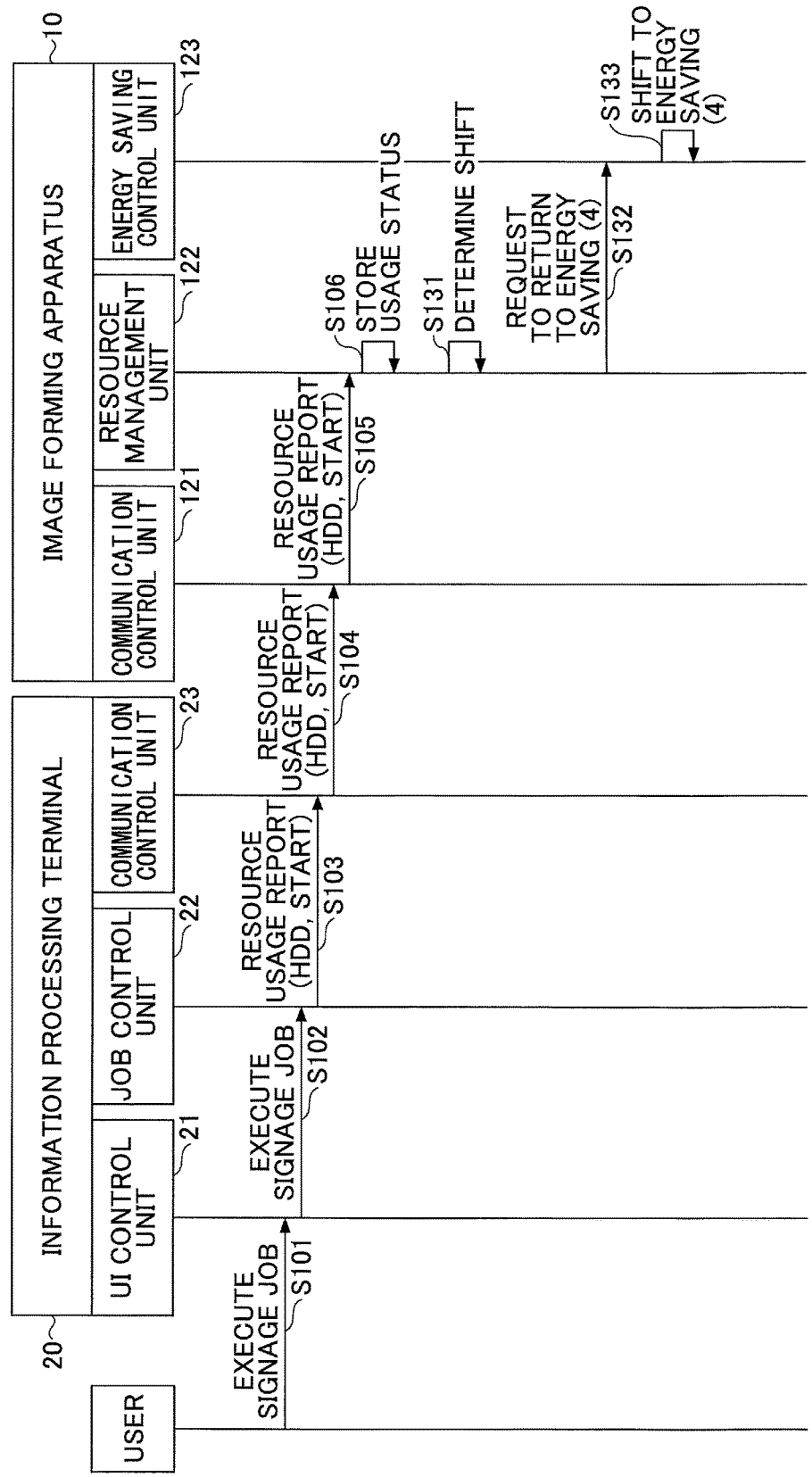
FIG. 8 is a sequence diagram of a second example of processing procedures executed by the information processing system.

FIG. 8 is a sequence diagram of a second example of processing procedures executed by the information processing system 1. In FIG. 8, the same steps as those of FIG. 5 are denoted by the same step numbers, and redundant descriptions are omitted.

After step S106, the resource management unit 122 determines that at the present energy saving level, power is not supplied to the HDD 114, of which the start of usage has been reported in step S105. The resource management unit 122 has determined the energy saving level to which shift is possible, and therefore recognizes the present energy saving level. Alternatively, to the resource management unit 122 may be inquired by the energy saving control unit 123 about the present energy saving level.

According to this determination, the resource management unit 122 determines the energy saving level to which shift is possible, based on the resource management table (FIG. 6) and the energy saving level table (FIG. 7) (step S131). The method of determination is the same as step S117. In this example, it is assumed that the contents of the resource management table are as illustrated in FIG. 6. Also, report information indicating the start of usage of the HDD 114 has been received in step S105, and therefore level 4 is selected.

Next, the resource management unit 122 makes a request to the energy saving control unit 123 to shift to level 4 (step S132). The energy saving control unit 123 causes the image forming apparatus 10 to shift to level 4, in response to the request (step S133). Note that when the energy saving control unit 123 receives a shift request from the resource management unit 122 as in step S133, the energy saving control unit 123 may execute the shift of the energy saving level, without inquiring the resource management unit 122 about whether shifting is possible.

Figure 9:
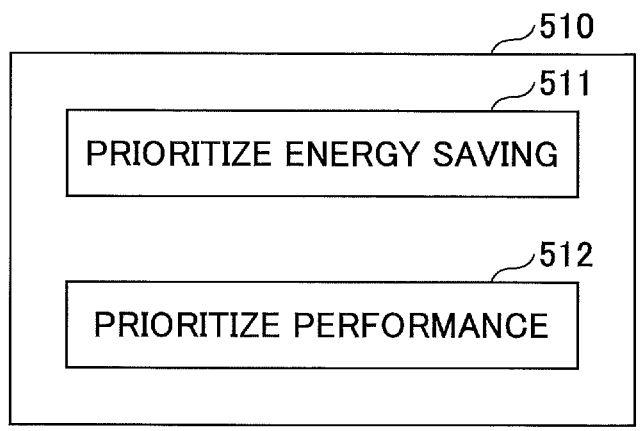
FIG. 9 illustrates an example of a setting screen with respect to an energy saving mode.

Incidentally, with regard to the control of the energy saving mode, the user may select which one to prioritize between energy saving (power saving) and performance (responsiveness or performance) via a screen as illustrated in FIG. 9, for example.

FIG. 9 illustrates an example of a setting screen with respect to the energy saving mode. In FIG. 9, a setting screen 510 includes a button 511 and a button 512. The button 511 is for receiving an instruction to prioritize energy saving. The button 512 is for receiving an instruction to prioritize performance.

The setting screen 510 is displayed by the UI control unit 21 on the display device 211. The selection result in the setting screen 510 is sent to the image forming apparatus 10 via the communication control unit 23. When the communication control unit 121 of the image forming apparatus 10 receives the selection result, the selection result is reported to the energy saving control unit 123. The energy saving control unit 123 stores information indicating the selection result, in the flash memory 116 or the HDD 114.

When information indicating to prioritize energy saving is stored, even if it is before the report information indicating the end of the usage of the HDD 114 is reported, as long as a predetermined condition is satisfied, the resource management unit 122 periodically receives an inquiry from the energy saving control unit 123 (step S116), and in response to the inquiry, the energy saving control unit 123 allows the shift to level 5. An example of a predetermined condition is that access to the resource (HDD 114) relevant to the report information is not performed for more than a predetermined time, during a period from when the report information is received in step S105 to when the report information is received in step S124. Alternatively, the predetermined condition may be that a predetermined time has passed from the time point of step S105, regardless of whether access is made to the HDD 114.

Meanwhile, when information indicating to prioritize performance is stored, even if the predetermined condition is satisfied, until the report information indicating the end of the usage of the HDD 114 is reported, the resource management unit 122 does not allow the shift to level 5. As a result, the access performance to the HDD 114 is maintained.

As described above, according to the present embodiment, in response to a request to use a particular resource from the information processing terminal 20 that is an external device of the image forming apparatus 10, the image forming apparatus 10 is prevented from shifting to an energy saving level in which power is not supplied to the particular resource. That is to say, it is possible to change the control of the energy saving mode (power saving state) according to external factors of the image forming apparatus 10.

As for the request to use a resource from an external device other than the information processing terminal 20, the image forming apparatus 10 may execute the same process as that of the present embodiment.

Note that in the present embodiment, the image forming apparatus 10 is an example of a device. The communication control unit 121 is an example of a reception unit. The resource management unit 122 is an example of a selection unit.

According to one embodiment of the present invention, a device and a control method are provided, which are capable of controlling a state of power supply to hardware resources according to external factors of a device.

The device and the control method are not limited to the specific embodiments described herein, and variations and modifications may be made without departing from the spirit and scope of the present invention.

The present application is based on and claims the benefit of priority of Japanese Priority Patent Application No. 2013-258940, filed on Dec. 16, 2013, the entire contents of which are hereby incorporated herein by reference.

What is claimed is:

1. An image forming device including at least one of a scanner and a printer, comprising:
   a memory storing:
      level information that includes a plurality of energy saving levels according to energy consumption of the image forming device and a plurality of combinations of hardware resources that are supply targets for the plurality of energy saving levels among a plurality of hardware resources including at least one of the scanner and the printer of the image forming device, each of the plurality of energy saving levels being associated with one of the plurality of combinations of hardware resources in the level information, and
      usage status information indicating whether hardware resource including at least one of the scanner and the printer of the image forming device is used, and
   a processor configured to perform a method including the steps of:
      first receiving, from an external device, a usage notification that one of the plurality of hardware resources including at least one of the scanner and the printer of the image forming device is used;
      storing, in the memory, the usage status information of hardware resource including at least one of the scanner and the printer of the image forming device, that is indicated by the usage notification in response to receiving the usage notification;
      second receiving, from the external device, an instruction for the image forming device to transition to an energy saving state;
      selecting an energy saving level for the image forming device from the plurality of energy saving levels based on the usage status information and the level information that are stored in the memory in response to the second receiving, and
      controlling a power supply of the plurality of hardware resources of the device including at least one of the scanner and the printer of the image forming device based on a combination of the hardware resources corresponding to a selected energy saving level.

2. The image forming device according to claim 1, wherein the selecting selects an energy saving level that corresponds to a combination of the hardware resources including hardware resource that is identified by the usage status information in response to the second receiving.

3. The image forming device according to claim 2, wherein the selecting selects an energy saving level that has a lowest energy consumption from energy saving levels that correspond to combinations of the hardware resources including hardware resource that is identified by the usage status information in response to the second receiving.

4. The image forming device according to claim 1, wherein the first receiving receives the usage notification indicating hardware resource to be used by the external device and being sent based on an instruction of a user to execute a job at the external device, and
   wherein the second receiving receives, from the external device, the instruction based on an operation of the user at the external apparatus for the image forming device to transition.

5. The image forming device according to claim 1, wherein the selecting selects the energy saving level for the image forming device from the plurality of energy saving levels based on the usage status information that is indicated by the usage notification received by the first receiving and the level information, said the usage status information and the level information being stored in the memory.

6. The image forming device according to claim 1, wherein each of the plurality of energy saving levels indicates a different energy consumption of the image forming device.

7. An image forming system including an image forming device including at least one of a scanner and a printer and an external device configured to operate the image forming device,
   wherein the external device comprises a first processor configured to perform a method including the steps of:
      controlling a job to be executed;
      first sending, to the image forming device, a usage notification that indicates hardware resource including at least one of the scanner and the printer of the image forming device to be used to execute the job upon executing the job; and
      second sending, to the image forming device, an instruction to transition to an energy saving state,
   wherein the image forming device comprises:
      a memory storing:
         level information that includes a plurality of energy saving levels according to energy consumption of the image forming device and a plurality of combinations of hardware resources that are supply targets for the plurality of energy saving levels among a plurality of hardware resources including at least one of the scanner and the printer of the image forming device, each of the plurality of energy saving levels being associated with one of the plurality of combinations of hardware resources in the level information, and usage status information indicating whether hardware resource including at least one of the scanner and the printer of the image forming device is used, and a second processor configured to perform a method including the steps of:

first receiving, from an external device, the usage notification that one of the plurality of hardware resources including at least one of the scanner and the printer of the image forming device is used;

storing, in the memory, the usage status information of hardware resource including at least one of the scanner and the printer of the image forming device, that is indicated by the usage notification in response to receiving the usage notification;

second receiving, from the external device, an instruction for the device to transition to an energy saving state;

selecting an energy saving level for the image forming device from the plurality of energy saving levels based on the usage status information and the level information that are stored in the memory in response to the second receiving, and controlling a power supply of the plurality of hardware resources of the device based on a combination of the hardware resources including at least one of the scanner and the printer of the image forming device corresponding to a selected energy saving level.

8. The image forming device according to claim 7, wherein the selecting selects an energy saving level that corresponds to a combination of the hardware resources including hardware resource that is identified by the usage status information in response to the second receiving.

9. The image forming device according to claim 8, wherein the selecting selects an energy saving level that has a lowest energy consumption from energy saving levels that correspond to combinations of the hardware resources including hardware resource that is identified by the usage status information in response to the second receiving.

10. The image forming device according to claim 7, wherein the first processor is further configured to perform the method including the steps of:

receiving an instruction to execute the job by a user and the instruction for the image forming device to transition to the energy saving state, wherein the first sending sends the usage notification based on the instruction to execute the job, and wherein the second sending sends the instruction for the image forming device to transition based on an operation of the user at the external apparatus.

11. The image forming device according to claim 7, wherein the selecting selects the energy saving level for the device from the plurality of energy saving levels based on the usage status information that is indicated by the usage notification received by the first receiving and the level information, said the usage status information and the level information being stored in the memory.

12. An image forming method performed by an image forming system including an image forming device including at least one of a scanner and a printer and an external device configured to operate the image forming device, said method including the steps of:

controlling, by the external device, a job to be executed;

first sending, by the external device, to the image forming device, a usage notification that indicates hardware resource including at least one of the scanner and the printer of the image forming device to be used to execute the job upon executing the job; and second sending, by the external device, to the image forming device, an instruction to transition to an energy saving state, wherein the image forming device comprises:

a memory storing:

level information that includes a plurality of energy saving levels according to energy consumption of the image forming device and a plurality of combinations of hardware resources that are supply targets for the plurality of energy saving levels among a plurality of hardware resources including at least one of the scanner and the printer of the image forming device, each of the plurality of energy saving levels being associated with one of the plurality of combinations of hardware resources in the level information, and usage status information indicating whether hardware resource including at least one of the scanner and the printer of the image forming device is used, and the method further includes the steps of:

first receiving, by the image forming device, from an external device, the usage notification one of the plurality of hardware resources including at least one of the scanner and the printer of the image forming device is used;

storing, by the image forming device, in the memory, the usage status information of hardware resource including at least one of the scanner and the printer of the image forming device, that is indicated by the usage notification in response to receiving the usage notification;

second receiving, by the image forming device, from the external device, an instruction for the image forming device to transition to an energy saving state;

selecting, by the image forming device, an energy saving level for the image forming device from the plurality of energy saving levels based on the usage status information and the level information that are stored in the memory in response to the second receiving, and controlling, by the image forming device, a power supply of the plurality of hardware resources including at least one of the scanner and the printer of the image forming device of the image forming device based on a combination of the hardware resources corresponding to a selected energy saving level.

13. The image forming method according to claim 12, wherein the selecting selects an energy saving level that corresponds to a combination of the hardware resources including hardware resource that is identified by the usage status information in response to the second receiving.

14. The image forming method according to claim 13, wherein the selecting selects an energy saving level that has a lowest energy consumption from energy saving levels that correspond to combinations of the hardware resources including hardware resource that is identified by the usage status information in response to the second receiving.

15. The image forming method according to claim 12, wherein the method further includes receiving, by the external device, an instruction to execute the job by a user and the instruction for the image forming device to transition to the energy saving state, wherein the first sending sends the usage notification based on the instruction to execute the job, and wherein the second sending sends the instruction for the device to transition based on an operation of the user at the external apparatus.

16. The image forming device according to claim 12, wherein the selecting selects the energy saving level for the image forming device from the plurality of energy saving levels based on the usage status information that is indicated by the usage notification received by the first receiving and the level information, said the usage status information and the level information being stored in the memory.

* * * * *